United States Patent [19]
Brophey et al.

[11] Patent Number: 5,147,559
[45] Date of Patent: Sep. 15, 1992

[54] CONTROLLING CONE OF DEPRESSION IN A WELL BY MICROPROCESSOR CONTROL OF MODULATING VALVE

[76] Inventors: Robert W. Brophey, 1134 Upton Ave. North; Robert J. Kadwell, 1111 Sheridan Ave. North, both of Minneapolis, Minn. 55411

[21] Appl. No.: 694,411

[22] Filed: May 1, 1991

Related U.S. Application Data

[62] Division of Ser. No. 412,939, Sep. 26, 1989, Pat. No. 5,028,212.

[51] Int. Cl.$^5$ .............. E21B 34/06; E21B 43/12; B01D 17/12
[52] U.S. Cl. .............................. 210/744; 137/1; 166/53; 166/373; 210/747; 210/776; 417/26; 417/27; 417/279; 417/303
[58] Field of Search .......... 137/1, 2, 386, 395, 137/409; 166/53, 54, 316, 373, 265; 251/64; 210/97, 143, 744, 747, 104, 776; 364/510, 496; 417/26-28, 279, 302, 303

[56] References Cited

U.S. PATENT DOCUMENTS

| | | | |
|---|---|---|---|
| 3,915,225 | 10/1975 | Swink | 166/53 |
| 4,273,650 | 6/1981 | Solomon | 210/104 |
| 4,625,801 | 12/1986 | McLaughlin et al. | 166/53 |
| 4,727,936 | 3/1988 | Mioduszewski et al. | 166/53 |
| 4,746,423 | 5/1988 | Moyer | 166/53 |
| 4,747,451 | 5/1988 | Adams et al. | 166/53 |
| 4,761,225 | 8/1988 | Breslin | 210/104 |
| 4,926,942 | 5/1990 | Profrock | 417/26 |
| 4,934,458 | 6/1990 | Warburton et al. | 166/53 |
| 5,013,218 | 5/1991 | Spencer | 166/265 |

FOREIGN PATENT DOCUMENTS

| | | | |
|---|---|---|---|
| 59-127118 | 7/1984 | Japan | 137/395 |
| 62-026506 | 2/1987 | Japan | 364/510 |
| 63-278101 | 11/1988 | Japan | 364/510 |

Primary Examiner—Robert A. Dawson
Assistant Examiner—Joseph Drodge
Attorney, Agent, or Firm—Leone & Moffa

[57] ABSTRACT

A method for removing floating immiscible liquids from a well containing both the floating immiscible liquids and water, where the floating immiscible liquids and water meet at a water interface, by controlling a cone of depression within the well. A removal system for removing said floating immiscible liquids is used including a microprocessor, a discharge water line and an upper water interface sensor where at least a portion of the discharge water line is located within the well. The upper water interface sensor is located within the well at a sensor location. The method includes the steps of inserting a modulating control valve into the discharge water line, the modulating control valve being connected to be controlled by the microprocessor, opening the modulating control valve when the water interface rises up to the sensor location, closing the modulating control valve when the water interface falls below the sensor location, and operating the microprocessor to open and close the modulating control valve at a rate which keeps the water interface at a substantially static level.

9 Claims, 8 Drawing Sheets

CONTROLLING CONE OF DEPRESSION IN A WELL BY MICROPROCESSOR CONTROL OF MODULATING VALVE

This application is a division of application Ser. No. 07/412,939, filed Sep. 26, 1989, now U.S. Pat. No. 5,028,212.

BACKGROUND OF THE INVENTION

This invention is directed generally to liquid separation within liquid containers such as underground wells and, more particularly, to a method and apparatus for removing substantially immiscible liquids, such as hydrocarbons or pollutants from a collecting well which contains both water and such immiscible liquids.

There are various known techniques for removing immiscible liquids (hereinafter generally referred to as "liquids" or "liquid product") from containment apparatus. One such method is to employ a "cone of depression" technique. As stated in U.S. Pat. No. 4,746,423, the use of a "cone of depression" for collecting hydrocarbons from an underground well containing an overlying immiscible liquid, usually a hydro-carbon product, from an underlying, conductive, heavier liquid in a two liquid body is well established. The technique requires a depression pump located at or near the bottom of a well to remove water in large enough quantities to actually lower the water table locally, and thereby cause underground liquids to drain toward the region in which the table is depressed. The lighter liquid products then collect within the well along with the water and typically as the water is pumped out by the depression pump, a skim pump located higher in the well, in the region atop the collected water where the lighter fluid products collect, is used to pump out the contaminants. Several examples of this technique and other removal schemes may be found in the patents listed below.

U.S. Pat. No. 4,273,650 to Solomon teaches a system using a cone of depression technique which employs a submergible, drawn down, electrically powered pump submerged at the bottom of a well. A water discharge control including the pump and the pump switch controls the flow of water from the well to establish and maintain by gravity flow a predetermined liquid level at a spaced distance below the static water table. In this way, a cone of depression is established. A combined pollutant pump and sensor apparatus including an electrically powered pollutant pump, a pump switch and sensors responsive to pollutant level to actuate the pump switch are supported in the well at the level of the apex of the cone of depression. The Solomon apparatus also includes sensors for sensing a low level water/pollutant interface and energizing the pollutant pump to pump pollutant into a tank while permitting the water/pollution interface to rise and also for sensing a high level water/pollutant interface and de-energizing the pollutant pump upon sensing the high level water/pollutant interface.

U.S. Pat. No. 4,469,170 to Farmer, Jr. teaches a skimmer which is designed to float in the two-liquid body contained in the well. The Farmer, Jr. skimming apparatus requires a float and, apparently, also requires a depression pump.

U.S. Pat. No. 4,746,423 to Moyer discloses a two pump skimmer system for recovery of lighter-than-water hydrocarbons from water wells. The pumps are located in individual chambers which are interconnected with the water chamber below the hydrocarbon chamber and with limited one-way flow into the water chamber. Both pumps are independently controlled by sensors in the upper chamber to assure that each pumps only the proper liquid.

U.S. Pat. No. 4,766,957 to McIntyre discloses a method and apparatus for gravitationally separating hydrocarbons and water discharged from a subterranean well. McIntyre teaches that a mixture of hydrocarbons and water flows into the interior of a well casing through perforations disposed adjacent the production zone. The water flows downwardly or is forcibly pumped downwardly to the water absorbing formation and is absorbed in such formation.

U.S. Pat. No. 4,770,243 to Fouillout, et al. shows a microprocessor controlled system for separating water from hydrocarbons. The Fouillout device is directed to the field of the production of petroleum from deposits in which water is mixed with hydrocarbons, and not to the skimming of contaminant hydrocarbons from a water producing well. Separation of the water from the hydrocarbons is accomplished at the bottom of the well in a packer.

U.S. Pat. No. 4,761,225 to Breslin discloses an apparatus for controlling the removal of liquid hydrocarbons from groundwater in a perforated well casing consisting of a plurality of pump chambers and a control system which is powered by compressed air.

The present invention has advantages over the prior art in that, it is believed that for the first time, it provides a highly dynamic, automatic microprocessor-controlled system which has a programmable operation capable of using a single sensor in combination with a float sensor to control both a skim pump and a depression pump, thereby promoting cooperation between the two pumps to result in hydrocarbon removal. The invention provides a microprocessor based controller for a "cone of depression" type removal system which heretofore has not been found in the prior art. In yet another aspect of the invention, a method and apparatus is provided to remove floating liquids using only an interface sensor and a microprocessor controlled skim pump, without employing a depression pump to create a cone of depression.

SUMMARY OF THE INVENTION

The present invention provides a method and apparatus for removing floating, substantially immiscible liquids such as hydrocarbons from containers or wells containing both liquids and water.

A method is disclosed for removing floating immiscible liquids from a well contianing both said floating immiscible liquids and water, where the floating immiscible liquids and water meet at a water interface, by controlling a cone of depression within the well. A removal system for removing said floating immiscible liquids is used including a microprocessor, a discharge water line and an upper water interface sensor, at least a portion of the discharge water line being located within the well. The upper water interface sensor is located within the well at a sensor location. The method includes the steps of inserting a modulating control valve into the discharge water line, the modulating control valve being connected to be controlled by the microprocessor, opening the modulating control valve when the water interface rises up to the sensor location, closing the modulating control valve when the water interface falls below the sensor location, and operating the microprocessor to open and close the modulating control valve at a rate which keeps the water interface at a substantially static level.

Other objects, features and advantages of the invention will become apparent to those skilled in the art through the description of the preferred embodiment, claims and drawings herein wherein like numerals designate like elements.

DESCRIPTION OF THE PREFERRED EMBODIMENT

Figure 1:
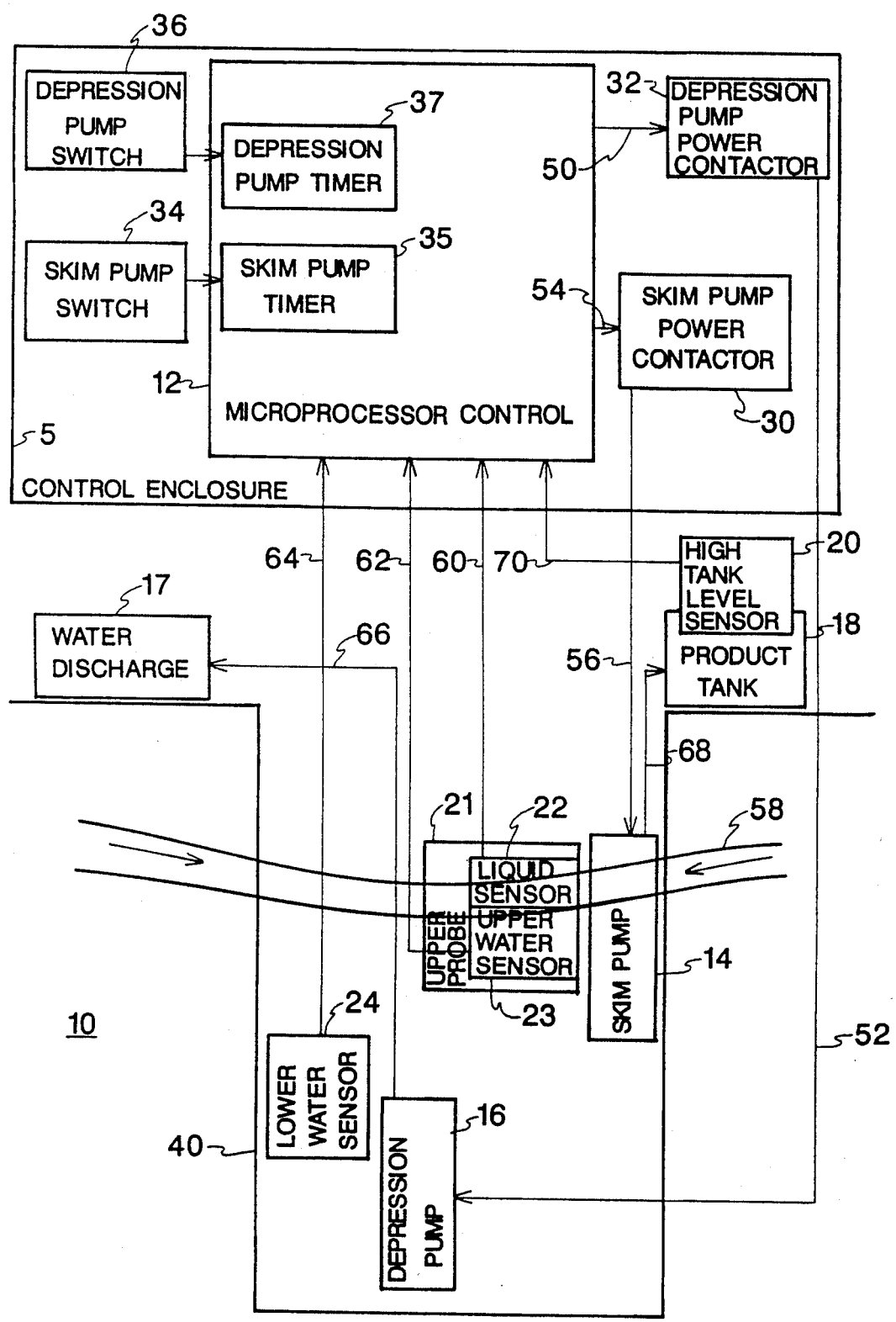
FIG. 1 is a block diagram of one embodiment of the apparatus of the invention.

Referring now to FIG. 1, a block diagram of one embodiment of the invention is shown schematically. The liquid product removal apparatus of the invention 10 for a cone of depression scheme comprises a microprocessor control 12, skim pump 14, liquid sensor 22, upper water interface sensor 23, depression pump 16, skim pump power contactor 30, depression pump power contactor 32, skim pump time delay switch 34, and depression pump time delay switch 36. In another aspect, the invention provides an apparatus and method for removal of floating liquids which may be used in a system not requiring a cone of depression technique. In such a system, the basic apparatus needed for hydrocarbon removal is microprocessor control 12, skim pump 14 and liquid sensor 22. In such a system, as long as liquid sensor 22 provided a signal indicating the presence of floating liquid products, the skim pump would be activated by the microprocessor control unit to pump out the liquids. The skim pump time delay switch 34 may still be utilized to prevent short cycling of the skim pump.

The microprocessor control may advantageously be any suitable microprocessor device such as an 8 bit microprocessor or similar device. In one embodiment of the invention, an INTEL model 8751 8-bit microprocessor is employed. The microprocessor and associated elements including the contactors and switches are preferably located in a control enclosure or housing 5. Those skilled in the art will appreciate the fact that any number of similar programmable devices, computers or equivalent circuits may also be employed to provide the microprocessor control function. The microprocessor executes a control algorithm according to the invention as described herein. The invention will first be described in terms of its functional elements, followed by a description of the operation of the invention.

The skim pump time delay switch 34 may be used to set a first time delay used in operating the skim pump. Similarly, the depression switch 36 may also be set manually or automatically in order to set a second time delay used in the operation of the depression pump. Both timers 35 and 37 are advantageously implemented in the software control algorithm executed by the microprocessor control. The settings of the switches 34 and 36 are read into the microprocessor control 12 during a program logic cycle. The switches 34 and 36 may be, for example, DIP switches o or equivalent devices. These parameters may also be provided in various ways such as by a digital device compatible with the microprocessor, such as a read only memory (ROM).

A first control output 50 of the microprocessor is connected to the depression power contactor 32. The depression power contactor operates in response to the output 50 in order to activate or deactivate the depression pump 16 through line 52. Similarly, a second microprocessor control output 54 is provided to skim pump power contactor 30 which activates or deactivates the skim pump 14 through line 56. Depression pump 16 may be any suitable depression pump as is commercially available and well-known by those skilled in the art. Similarly, skim pump 14 may be any suitable, commercially available skim pump for pumping hydrocarbons. Both skim pump 14 and depression pump 16 are supported by well-known means in well 40. The skim pump 14 is advantageously placed at a position in the well which is proximate to the water interface. Depression pump 16 is located below skim pump 14 nearer to the bottom of the well where it is totally submerged in water and does not come into contact with hydrocarbon fluid product.

Liquid sensor 22 and upper water interface sensor 23 may advantageously be housed together in upper probe 21. Liquid sensor 22 senses the presence of liquids. The liquid sensor may advantageously be a float switch. Other types of sensors could be used including sensors responsive to capacitance, optical refraction or thermal conductivity. Such devices are well-known in the art. The liquid sensor 22 provides a sensing signal transmitted on line 60 to a first input of the microprocessor control. Upper water interface sensor 23 is located adjacent to liquid sensor 22 and provides a water interface sensing signal on line 62 to a second input of the microprocessor control. An optional lower water interface sensor 24 of the same type as the upper water interface sensor may be included. If used, the lower water interface sensor 24 is preferably disposed between the skim pump and the depression pump intakes. Lower water interface sensor 24 also provides a sensing signal to a third input of the microprocessor control on line 64. The upper and lower water interface sensors may preferably be well-known conductivity sensors or equivalent devices. Other devices which may be used include float sensors which are buoyant in water, but not in hydrocarbon products.

The depression pump 16 discharges water through conduit 66 to an appropriate discharge location 17. The skim pump 14 discharges hydrocarbon product into product tank 18 through conduit 68. The product tank 18 include a high tank level sensor 20 which senses the tank level. A tank level sensing signal is presented by the high tank level sensor to a fourth input of the microprocessor control through line 70.

Figure 2:
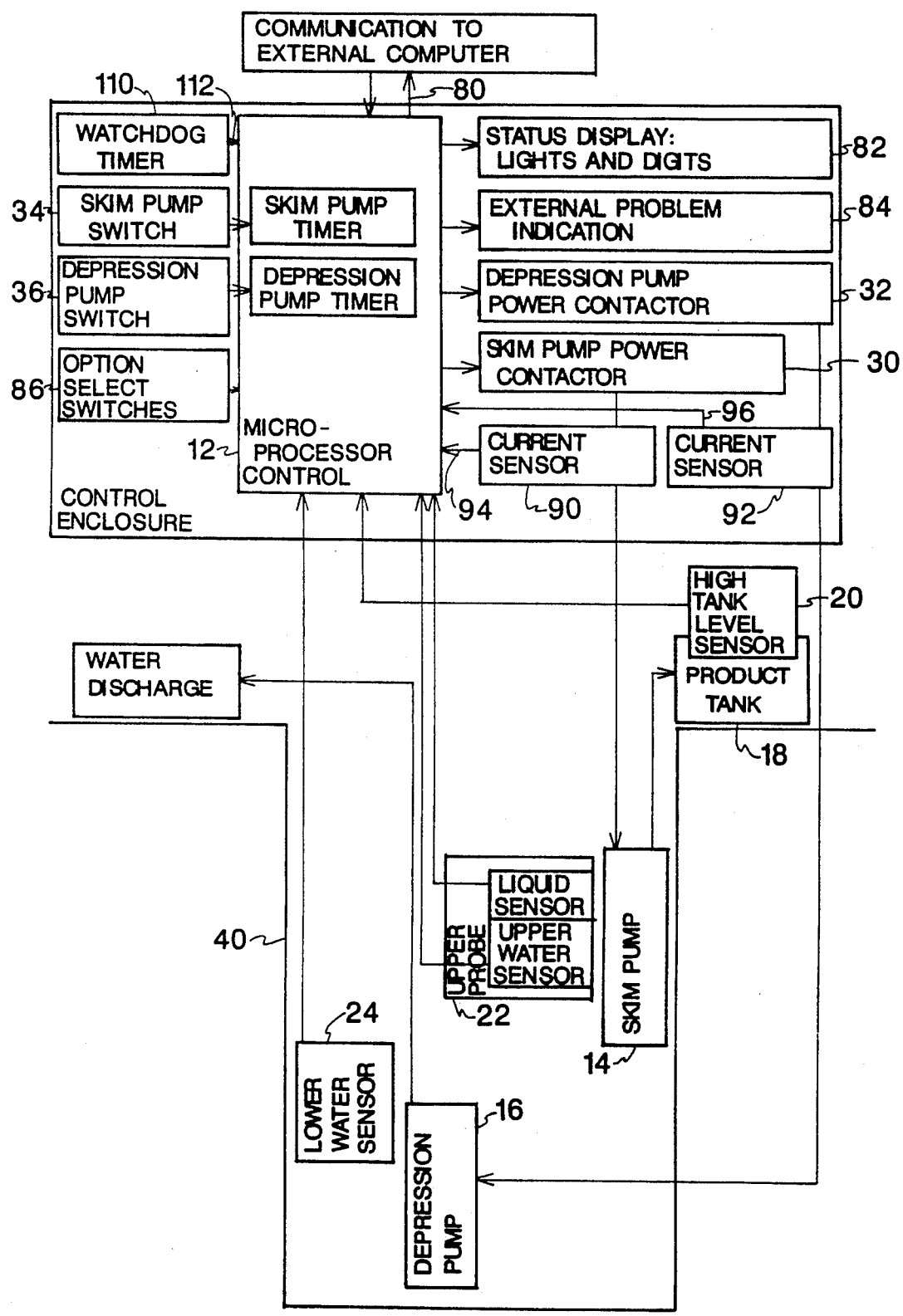
FIG. 2 is a bock diagram of an alternate embodiment of the apparatus of the invention.

Referring now to FIG. 2, an alternate embodiment of the apparatus which comprises the invention is shown. In the embodiment shown in FIG. 2, optional features have been added to the system shown in FIG. 1. These additional features include a communications bus 80, status display 82, external problem indicators 84, option select switches 86, and current sensors 90 and 92.

The communications bus 80 may comprise any communication lines suitable for interfacing the microprocessor control with an external computer, such as a personal computer or main frame computer. Utilizing such a communications bus, an operator can easily monitor the well operation or modify a program in the microprocessor control to accommodate local special conditions. Optional select switches 86 may be provided for programming optional features such as engaging or ignoring the lower water interface sensor. Current sensor 90 provides a current sensing signal corresponding to the driving current in the skim pump referenced to a predetermined set point. If the current exceeds the predetermined set point, the microprocessor control processes the signal as indicating that the skim pump is pumping. Similarly, current sensor 92 measures the depression pump current and provides a signal on line 96 which corresponds to a measurement of whether or not the current in the depression pump exceeds a predetermined set point indicating that the depression pump is pumping. The signals from the optical current sensors may be used for monitoring operation of the well and are not employed in the preferred embodiment to effect the operation of the control system. Other optional features may be included to assure proper set up at a given well location. For example, jumpers may be supplied in the interface connectors (not shown) for the liquid sensor, upper water interface sensor, lower water interface sensor, and high tank level sensor to supply a continuity signal to the microprocessor controller when each of these devices is properly plugged into the control enclosure.

Status display 82 may include a digital display to show the operating time of current operation which may, advantageously, optionally alternate with a display elapsed time from previous operations. Status lights may also be included in the display for indicating current conditions of sensors and the controller cycle. Some of the status displays may advantageously be driven directly by the input lines to the microprocessor control instead of being driven by the microprocessor. A watch dog timer 110 may also be included to provide a reset signal to the microprocessor control in the event of a processor malfunction such as the program counter jumping to execute a non-program, a memory overflow, endless loop condition, etc. This reset signal is supplied by lines 112. When the microprocessor is properly executing its program, it will periodically reset the watch dog timer.

OPERATION OF THE INVENTION

Having described the elements of the invention and their relationship to each other, it is believed that the features and advantages of the invention can be better appreciated through a detailed description of the operation and method of the invention as provided herein below.

Figure 3:
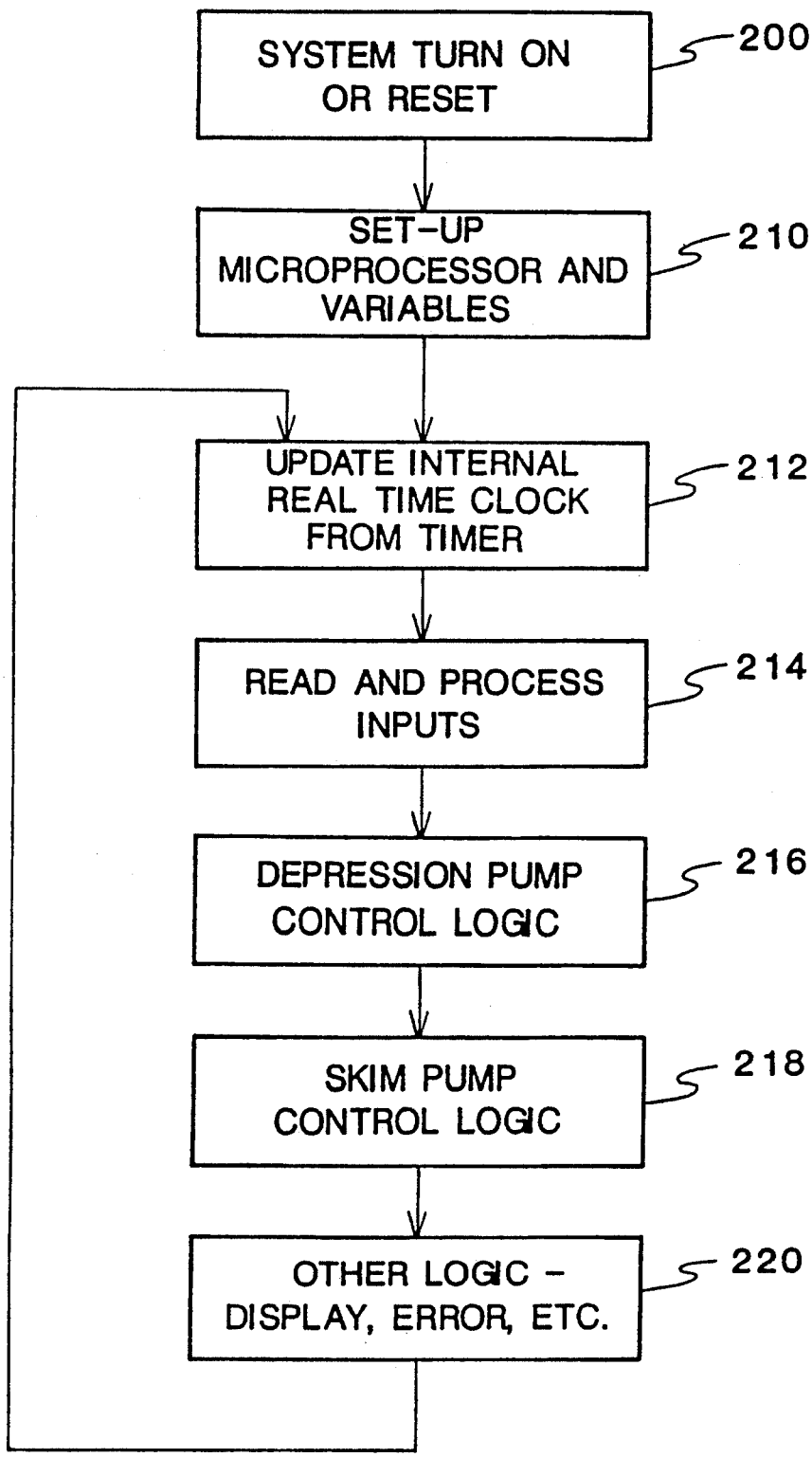
FIG. 3 is a high level flow chart illustrating generally the method of the invention.

Referring now to FIG. 3, a high level flow chart illustrating generally the method of the invention is shown. Those skilled in the art will appreciate that the precise order of events shown in FIG. 3 is not critical to the operation of the invention, but that many alternative configurations are possible to implement the principles of the invention. However, for the sake of illustrating the invention, the flow chart used in FIG. 3 will be used with the understanding that it is intended for illustration of the invention and not by way of limitation of the invention. At step 200, the system is turned on (or reset, as by the watchdog timer, depending upon the condition in which the process is being entered). The process then proceeds to step 210 wherein the microprocessor and variables, including initial values of outputs, flags and counters are set up and initialized.

At step 212, the microprocessor internal real time clock is updated from a an internal microprocessor timer and the microprocessor oscillator. Next, at step 214 the microprocessor control reads and processes the various inputs as provided from the liquid sensor, upper water interface sensor, lower water interface sensor, high tank level sensor, and other external lines. After step 214, the microprocessor control proceeds to cycle through the depression pump logic at step 216 which is explained in more detail hereinbelow with reference to FIG. 4. Upon exiting the depression pump logic sequence at 216, the skim pump logic sequence is entered at step 218. The skim pump logic sequence is explained in more detail with reference to FIG. 5 herein. Upon completing the skim pump logic cycle at step 218, the processor optionally executes step 220 wherein outputs are provided to the display panel and problem indication devices 84. The microprocessor control continues to cycle through steps 212 through 220 until the system is turned off or reset.

Figure 4:
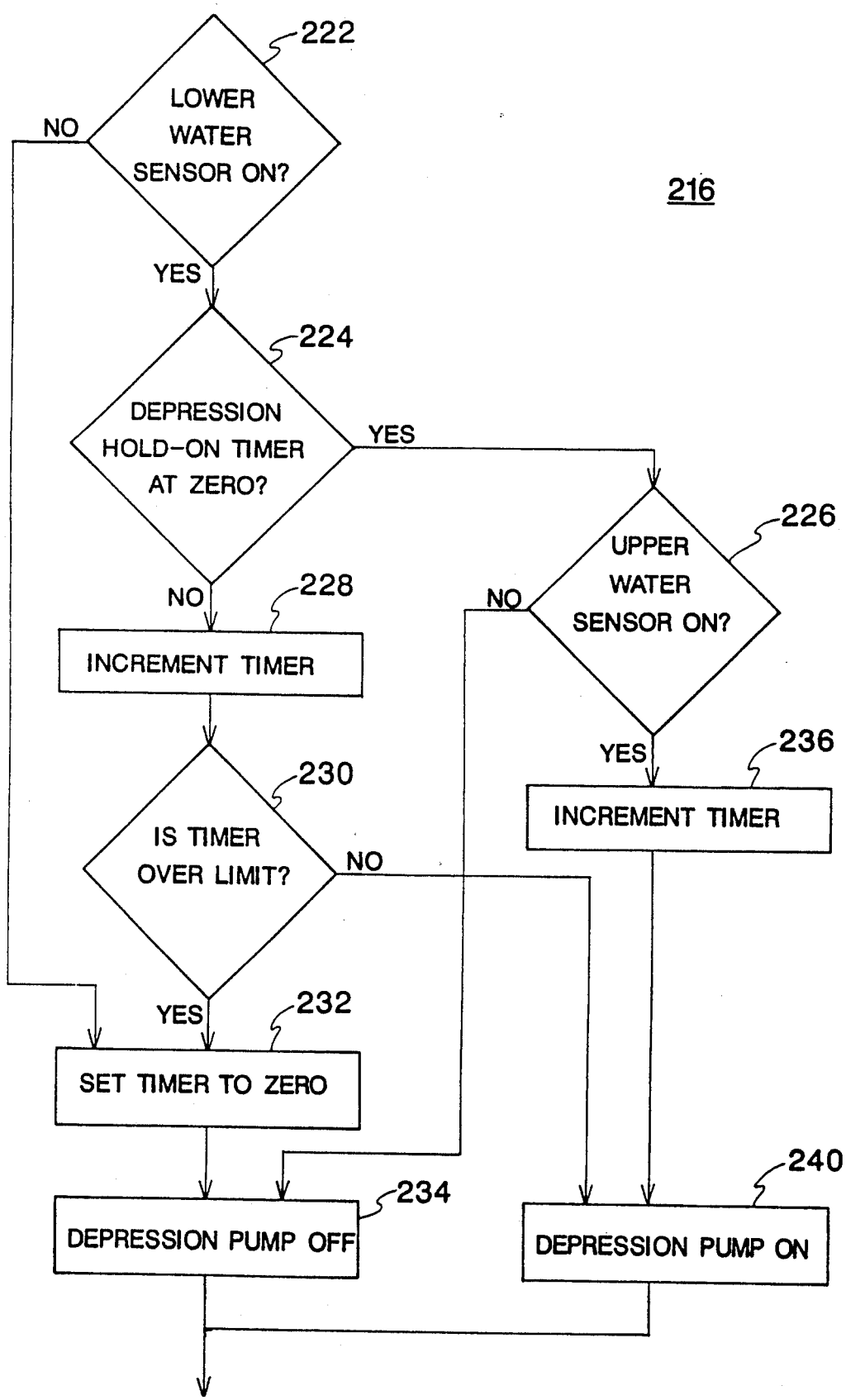
FIG. 4 is a detailed flow chart of the control scheme of a depression pump as employed by one embodiment of the invention.

Referring now to FIG. 4, a more detailed flow chart of the control scheme of the depression pump as employed by one embodiment of the invention is shown. If the option select switches 86 are set to utilize the low water interface sensor, optional step 222 will be included in the computer algorithm being executed by the microprocessor. Otherwise the depression pump control scheme will begin at step 224. Assuming that the low water interface sensor option is selected, block 222 utilizes the input on line 64 in order to determine whether or not a low water interface is being sensed by the low water interface sensor 24. If the low water interface sensor is on, indicating that the water interface is at or above the low water sensor, the process flow continues to step 224. If the low water sensor is off, indicating that the water interface is below the low water sensor, the low water sensor output signal on line 64 will carry a corresponding electrical algorithm to proceed to step 232. At step 224, the microprocessor checks the timer for the depression pump cycle. If the timer has been set to zero, indicating the depression pump is currently off, the process proceeds to step 226. If the timer holds a value other than 0, the timer is incremented at step 228 and control then proceeds to step 230. Assuming the branch to step 230 is followed, the internal depression time is compared to the time delay set by depression pump switch 36 at step 230. If the timer is over the limit, control proceeds to step 232. At step 232, the timer is set equal to 0 which indicates that the pump has been turned off. Note that step 232 may also be entered from optional step 222 if the low water interface sensor is in the "off" condition. Step 232 is exited and control proceeds to step 234 wherein the depression pump is turned off by the microprocessor control operating through the depression pump contactor 32.

Assuming that the "yes" branch from step 224 is executed, the processor then executes step 226 wherein the signal from the upper water interface sensor is read and processed by the microprocessor control to determine whether or not the water interface is at or above the high water sensor. If the signal from the upper water interface sensor 23 on line 60 indicates an "on" condition, this indicates that the water interface is at or above the upper water interface sensor and the process proceeds to step 236 wherein the timer is incremented and started. If the upper water interface sensor provides a signal on line 60 indicating an "off" condition, that is, indicating that the water interface is below the upper water level sensor, tho process branches to step 234, wherein the depression pump is kept off by the microprocessor control supplying an appropriate control signal to the depression pump power contactor 32. Step 240 is entered either via step 236 or the "no" branch of step 230. At step 240, the microprocessor control supplies an appropriate signal to the depression pump power contactor via lines 50 to turn the depression pump on. Following the above described control process, the depression pump will always run if the upper water sensor indicates that the water interface level is at or above the level of the upper water sensor. Further, the depression pump will run until the time delay as set by the depression pump switch 36 has elapsed. If the lower water interface sensor is used, it will override the time delay and assure that the depression pump does not run when the water interface is below the lower water interface sensor level.

Figure 5:
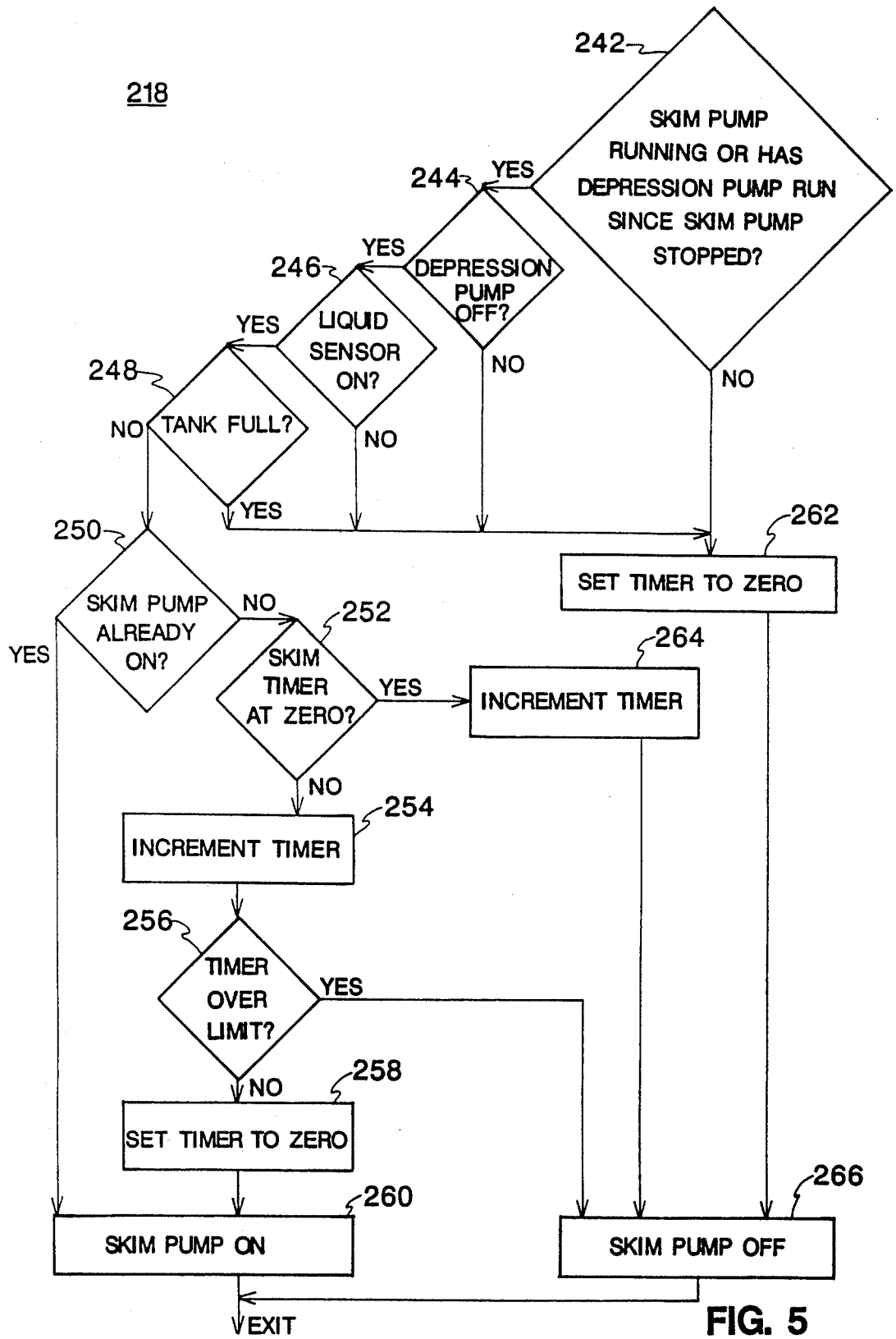
FIG. 5 is a detailed flow chart of the control scheme of a skim pump as employed by one embodiment of the invention.

Referring now to FIG. 5, a flow chart showing the control scheme for the skim pump is shown. Decision step 242 is entered when step 216 has been completed. At step 242, the microprocessor control determines whether the skim pump is currently running. If the skim pump stops, the processor determines whether the depression pump has run since the skim pump stopped. This step is not essential to the operation of the skim pump but is useful in preventing short cycling of the skim pump. If the skim pump is running or the depression pump has run since the skim pump stopped running, the process proceeds to step 244 which determines whether or not the depression pump is off.

In an alternate embodiment of the invention wherein the optional step 244 is eliminated from the logic flow shown in FIG. 5, the depression pump and the skim pump may operate concurrently. In such an alternate embodiment, step 242 would be replaced by an alternate step 242 to determine the statue of the upper water interface sensor. If the upper water interface sensor was on for a few seconds, control would proceed to step 262. If the upper water interface sensor was off, control would proceed to step 246.

Assuming step 244 is executed and the depression pump is not running, control then proceeds to decision block 246 wherein the microprocessor determines from the signal on line 60 whether or not the liquid sensor 22 is on. If the liquid sensor is on, it indicates the presence of hydrocarbon product. The liquid sensor may be, for example, a float switch. If the liquid sensor is on, process flow continues to step 248. At step 248, the signal on status line 70 is processed by the microprocessor control to determine whether or not the product tank 18 is full as indicated by the high tank level sensor 20. If the tank is not full, process flow continues to step 250 wherein the skim pump's current status is checked by the microprocessor control. If the skim pump is not running, the skim pump hold-off timer is checked at step 252. If the skim pump timer is set to 0, the timer is incremented at step 264 starting the timing process, and the skim pump is kept off at step 266 prior to exiting the control algorithm. If the skim pump timer is not equal to 0, the skim pump hold-off timer is incremented at step 254. At step 256, the skim pump hold-off timer is compared against the time limit as set by skim pump time delay switch 34. If the hold-off timer is over the limit, the timer is set to 0 and the skim pump is turned on. If the timer is under the limit, the skim pump is kept off at step 266 prior to exiting the routine. If any of the conditions at steps 242, 244, and 246 are determined to be negative, the skim pump hold timer is set to 0 at step 262 and the skim pump is turned off. If the product tank is full as determined at 248, the process also flows through steps 262 and 266 and then exits. Using the above control algorithm, the skim pump timer will not be activated during a predetermined time delay period which is initiated by the liquid sensor turning on. Further, the skim pump will not operate when the depression pump is running.

Figure 6:
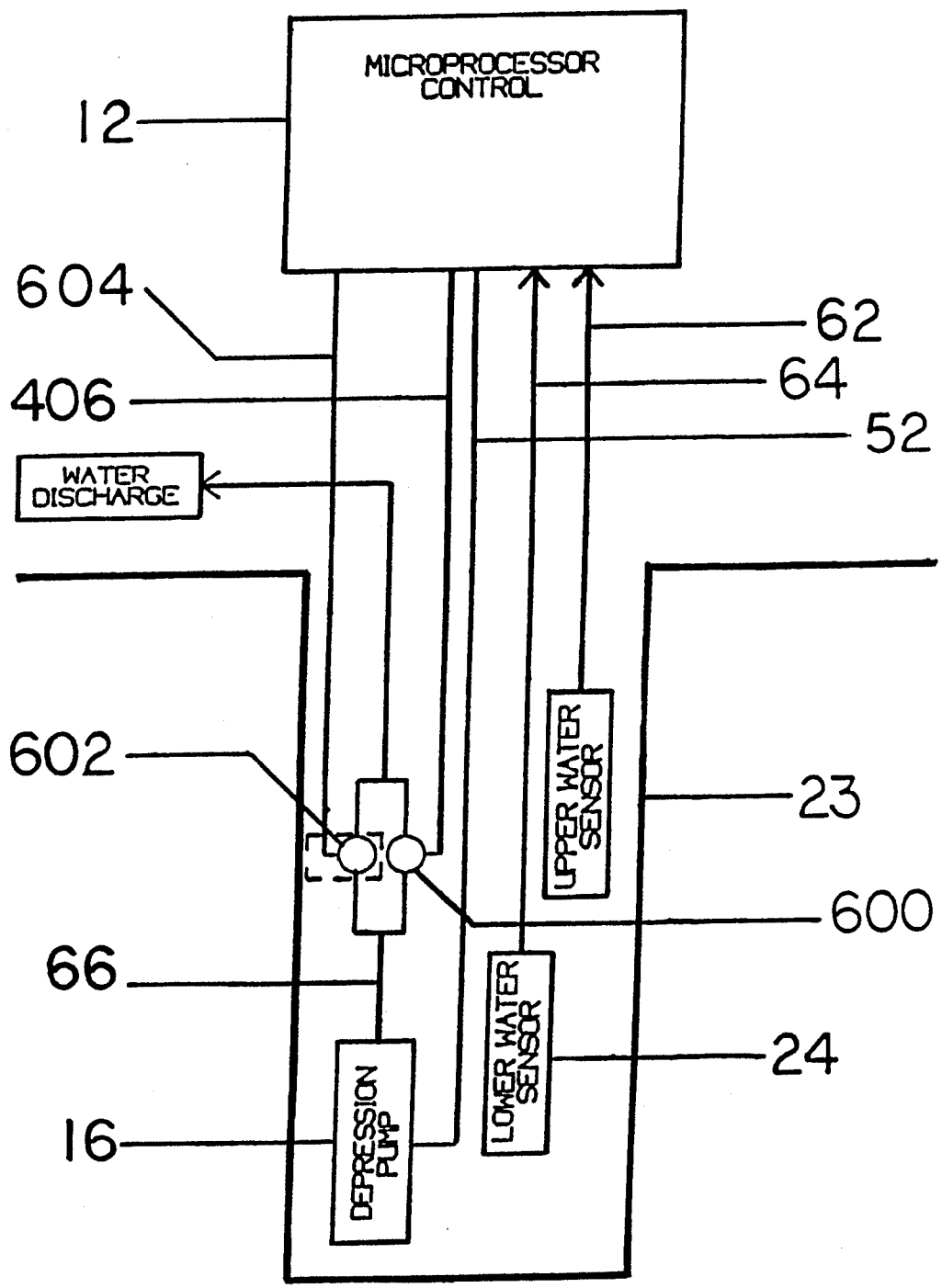
FIG. 6 is a block diagram of a further alternative embodiment of the invention employing a modulating valve for regulating water discharge from the depression pump.

Referring now to FIG. 6, a block diagram of yet a further alternate embodiment of the invention is shown. The difference between the embodiment shown in FIG. 6 and the embodiment shown in FIG. 1 is substantially in the introduction of modulating valve 600 and optional solenoid valve 602 which controls the water discharge from the depression pump. Only those elements significant to this alternate embodiment are shown and it will be understood that other elements as depicted in FIG. 1 may be used in combination with the system shown in FIG. 6 as necessary. In the scheme shown in FIG. 6, the depression pump is controlled only through the low water sensor and the water line 66 is controlled at the surface by a modulating control valve or motor controlled throttling valve 600. As indicated in FIG. 6 and as discussed hereinabove with reference to FIG. 1, the depression pump may be turned on and off through a signal from the microprocessor on line 52 in response to a low water interface signal 64 from lower water interface sensor 24. Similarly, as shown in FIG. 6, the solenoid valve 602 is operated by the microprocessor through line 604 and the modulating control valve 600 is operated by the microprocessor through signal line 406. The valve 600 slowly opens when water is sensed at the upper water sensor 23 and slowly closes when water falls below the upper water sensor. The rate of opening and closing the valve may advantageously be set so as to control the water interface 58 at a substantially static level. The speed of opening and closing the modulating valve may be optimized using an algorithm executed by the microprocessor based on historical experience in the well being pumped. Optionally, a solenoid valve 602, operated by microprocessor P1 may advantageously be added across the modulating valve. When using the solenoid valve, when the power is first turned on, the solenoid valve opens and the modulating valve does not move until the water interface falls below the upper water sensor. At that point, the solenoid valve may be inactivated and the modulating valve is used for the duration for the operation of the pump 16.

Figure 7:
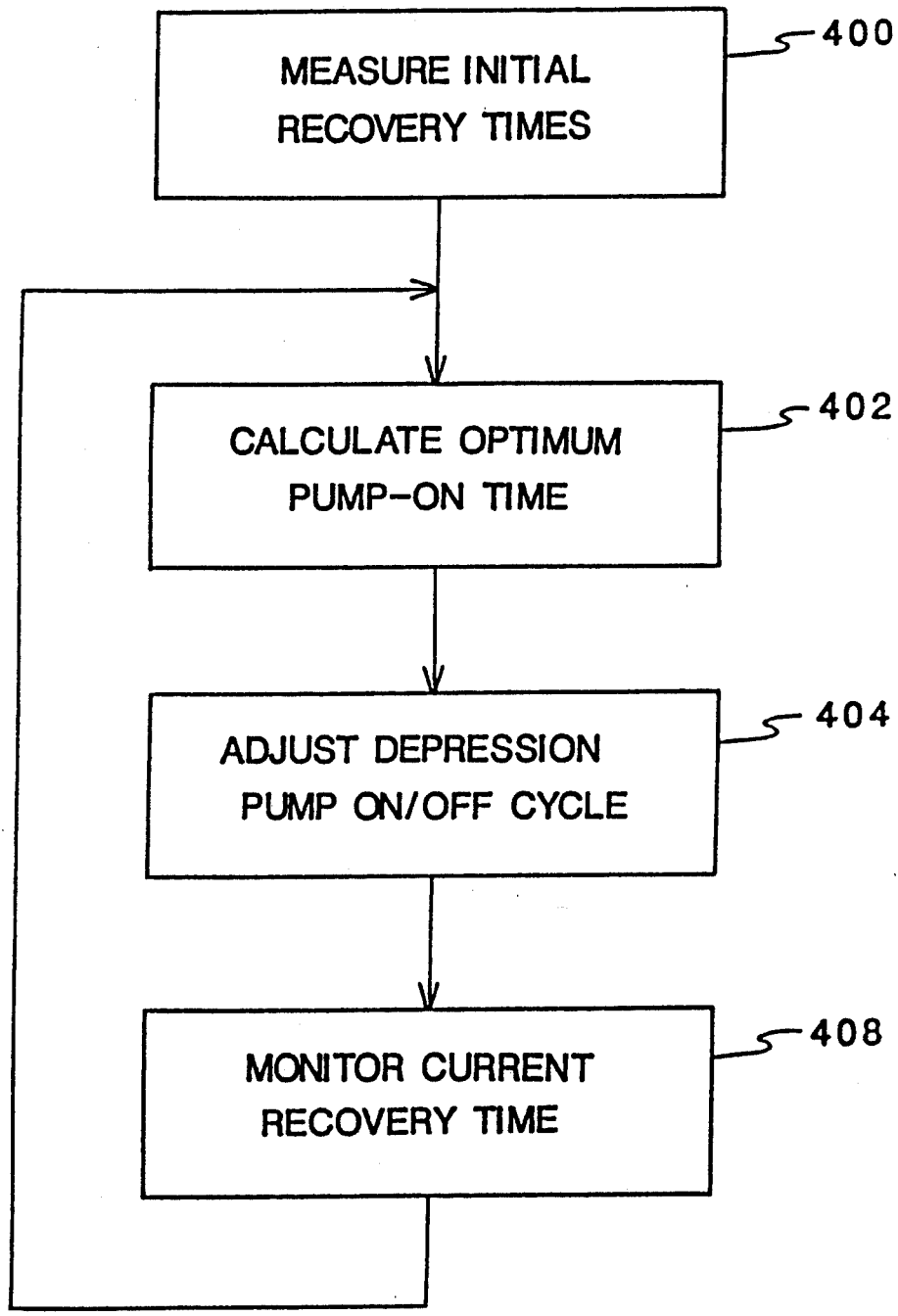
FIG. 7 is a flow chart of a method of optimizing liquid product removal as provided by the invention.

Referring now to FIG. 7, a flow chart of another feature of the method of the invention is shown. As detailed in FIG. 7, the invention provides a computer algorithm executed by the microprocessor control for optimizing and dynamically changing the on-off cycle for the depression pump based upon prior experience data for a holding container, such as a well. At step 400, a series of initial recovery times for the water interface 58 are measured and stored in memory. The recovery time is defined as the time it takes for the water interface to return to the skim pump level as measured from the time the depression pump is turned off. The control then executes step 402 for calculating the optimum pump-on time initially based upon the measured initial recovery times found at step 400 and the optimum total cycle time for the depression pump as supplied by the manufacturer or as determined by the operator. Subsequent cycles through the algorithm will incorporate measurements of currently measured recovery times. The optimum pump-on time will usually be set to avoid short cycling of the skim pump. A typical total pump-on plus recovery time is about 15 minutes. The optimum pump-on time will vary from well to well. Once the optimum pump-on time has been calculated, the microprocessor adjusts the depression pump cycle time at step 404. At step 408 the current recovery time is monitored. The cycle then returns to step 402 and repeats while continuing to add to and use the historical data being accumulated for the well which includes the initial and current recovery times and the depression pump optimum total cycle time.

Figure 8:
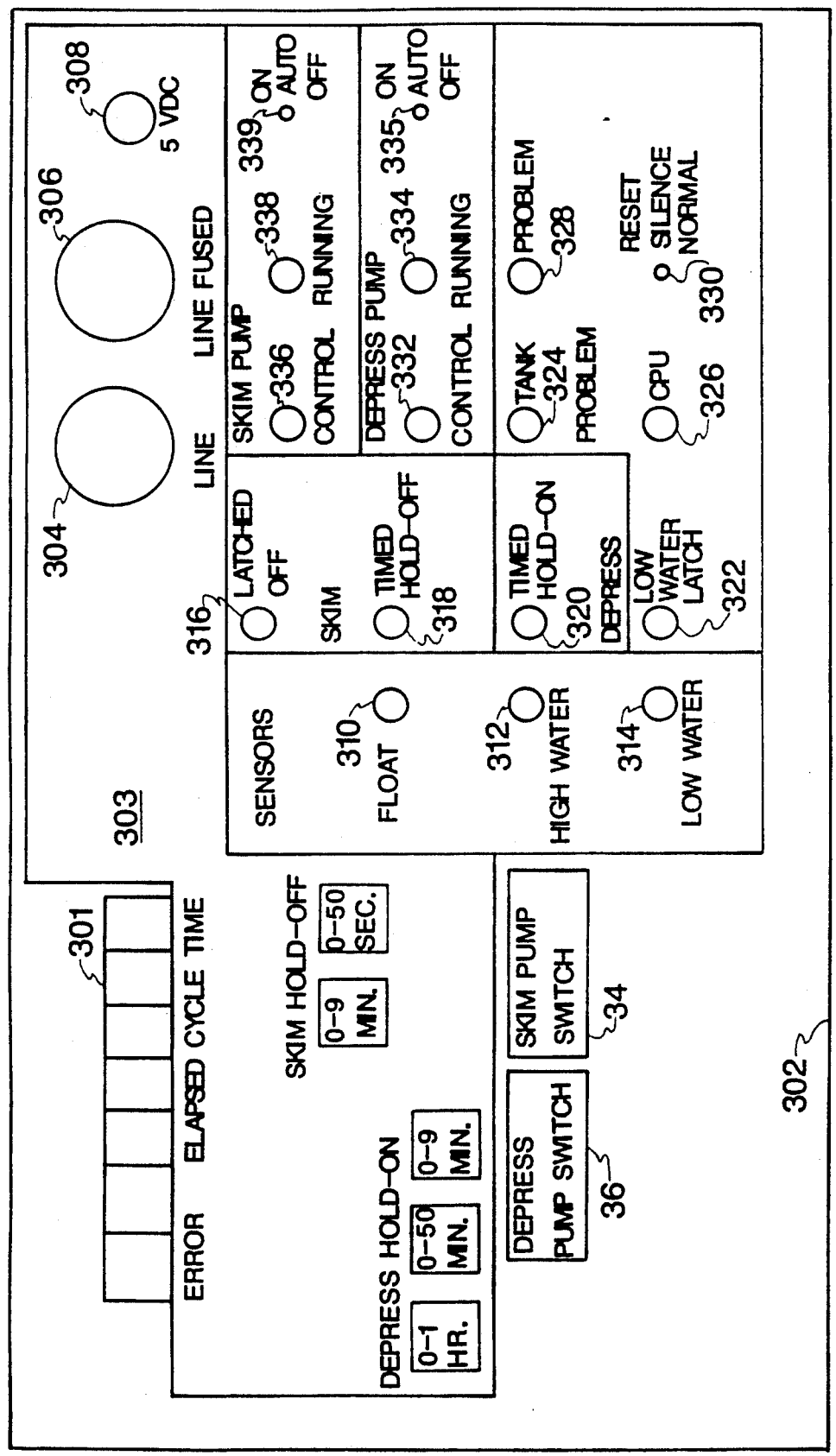
FIG. 8 illustrates an example of a control panel employed by one embodiment of the invention.

FIG. 8 shows an example of a control panel provided by one embodiment of the invention. The control panel 300 is used to interface with operators running the system. The panel 300 comprises a printed circuit board 302 upon which are mounted switches 34 and 36, numerical display indicators 301 and front panel 303. Front panel 303 is divided into a plurality of segments including a SENSOR segment comprising indicators 310, 312 and 314, a first SKIM PUMP segment comprising indicators 316 and 318, a second SKIM PUMP segment comprising indicators 336, 338 and switch 339, a DEPRESSION PUMP segment comprising indicators 332 and 334 and switch 335, and a PROBLEM SEGMENT including indicators 322, 324, 326, and 328 and switch 330.

The front panel 303 is positioned on the printed circuit board so as to align the DEPRESSION HOLD-ON nomenclature over depression switch 36 and the SKIM HOLD-OFF nomenclature over depression switch 34. Similarly, the nomenclature designating ERROR and ELAPSED CYCLE TIME is positioned under display indicators 301. Indicators 301 may comprise a plurality of seven segment numerical display devices or similar read-out devices. In one embodiment of the invention, two elements are used to display error indications and four elements are used to display elapsed time for the current and previous operating cycles. Indicators 304, 306 and 308 indicate the presence or absence of power to the system. In the SENSORS segment of the display, indicator 310 is designated as FLOAT, indicator 312 is designated HIGH WATER and indicator 314 is designated LOW WATER. When the indicators are lit, it is a signal to the operator that the named device or function is in the "on" condition or that the function named is "true".

A typical device will be provided with both audio and visual alarms, therefore, in the PROBLEM segment of the control panel, the operator may turn off the audio alarm by positioning switch 330 in the SILENCE mode. As can be seen in FIG. 8, problem indication lights 322, 324, 326 and 328 are provided. Similarly, indicator lights are provided to indicate microprocessor control and running of the skim pump by lights 336 and 338 and depression pump by lights 332 and 334. Also, the operator may override automatic control of either the skim pump or the depression pump through utilizing switches 339 and 335, respectively.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for removing floating and substantially immiscible liquid from a well containing both said floating immiscible liquids and water, wherein said floating immiscible liquid and water meet at a water interface, by controlling a cone of depression having an apex within the well using a removal system for removing said floating immiscible liquids, the removal system including a mircoprocessor, a discharge water line and an upper sensor, at least a portion of the discharge water line being located within the well, the upper sensor being located within the well at a sensor location, and wherein the upper sensor supplies signals to the microprocessor indicating the presence of the water interface, the method comprising the steps of:
   a. inserting a modulating control valve into the discharge water line, the modulating control valve being connected to be controlled by the microprocessor;
   b. adapting the microprocessor in response to the signal from the upper sensor, to control opening of the modulating control valve when the water interface rises up to the sensor location;
   c. adapting the microprocessor in response to the signal from the upper sensor to control closing of the modulating control valve when the water interface falls below the sensor location; and
   d. adapting the microprocessor, in response to the signal from the upper sensor to control the opening and closing of the modulating control valve at optimal speeds which keeps the apex of the cone of depression at a substantially static level.

2. The method of claim 1 wherein the removal system further includes a lower sensor having a low water signal line coupled to the microprocessor, the lower sensor located proximate a depression pump wherein the depression pump is connected to one end of the discharge line within the well and is also electrically connected to a microprocessor control line, the method further comprising the step of adapting the microprocessor to actuate shutting off of the depression pump when the lower sensor senses the presence of the immiscible liquid and transmits a low water signal to the microprocessor.

3. The method of claim 2 wherein the microprocessor optimizes the speeds of opening and closing of the modulating control valve based upon historical well pumping experience.

4. A method for removing floating and substantially immiscible liquids from a well containing both said floating immiscible liquids and water, wherein said floating immiscible liquids and water meet at a water interface, by controlling a cone of depression within the well using a removal system for removing said floating immiscible liquids, the removal system including a microprocessor, a discharge water line and an upper water interface sensor, at least a portion of the discharge water line being located within the well, the upper water interface sensor being located within the well at a sensor location, and wherein the upper water interface sensor supplies signals to the microprocessor indicating the presence of the water interface, the method comprising the steps of:
   a. inserting a modulating control valve into the discharge water line, the modulating control valve being connected to be controlled by the microprocessor;
   b. adapting the microprocessor to cause water discharged to initially bypass the modulating control valve by actuate opening of a solenoid valve in the discharge line immediately after a pumping power source is turned on valve until the water interface initially falls below the sensor location;
   c. adapting the microprocessor to then deactivate the solenoid valve; subsequently controlling discharge through the discharge water line by the steps of:
   d. adapting the microprocessor, in response to signals from the upper water interface sensor, to control opening of the modulating control valve when the water interface rises up to the sensor location; subsequently controlling discharge through the discharge water line by the steps of:
   e. adapting the microprocessor, in response to signals from the upper water interface sensor, to control closing of the modulating control valve when the water interface falls below the sensor location; subsequently controlling discharge through the discharge water line by the steps of: and
   f. adapting the microprocessor, in response to signals from the upper water interface sensor, to control the opening and closing of the modulating control valve at optimal speeds which keep the water interface at a substantially static level.

5. The method of claim 4 wherein the removal system further includes a lower water interface sensor connected to the microprocessor by a low water signal line and located proximate a depression pump wherein the depression pump is connected to one end of the discharge line within the well and is also electrically connected to a microprocessor control line, the method further comprising the step of adapting the microprocessor to actuate shutting off of the depression pump when the lower water interface sensor senses the water interface and transmits a low water signal to the microprocessor.

6. The method of claim 5 wherein the microprocessor optimizes the speeds of opening and closing of the modulating control valve based upon historical well pumping experience.

7. A method for removing floating and substantially immiscible liquid from a well containing both said floating immiscible liquids and water, wherein said floating immiscible liquids and water meet at a water interface, by controlling a cone of depression within the well using a removal system for removing said floating immiscible liquids, the removal system including a microprocessor, a discharge water line and an upper water interface sensor, at least a portion of the discharge water line being located within the well, the upper water interface sensor being located within the well at a sensor location, and wherein the upper water interface sensor supplies signals to the microprocessor indicating presence of the water interface, the method comprising the steps of:
   a. inserting a modulating control valve into the discharge water line, the modulating control valve being connected to be controlled by the microprocessor;
   b. adapting the microprocessor, in response to signals from the upper water interface sensor, to control opening of the modulating control valve when the water interface rises up to the sensor location;
   c. adapting the microprocessor, in response to signals from the upper water interface sensor, to control closing of the modulating control valve when the water interface falls below the sensor location; and
   d. adapting the microprocessor, in response to signals from the upper water interface sensor, to control the opening and closing of the modulating control valve at optimal speeds which keep the water interface at a substantially static level.

8. The method of claim 7 wherein the removal system further includes a lower water interface sensor connected by a low water signal line to the microprocessor and located proximate a depression pump wherein the depression pump is connected to one end of the discharge line within the well and is also electrically connected to a microprocessor control line, the method further comprising the step of adapting the microprocessor to actuate shutting off of the depression pump when the lower water interface sensor senses the water interface and transmits a low water signal to the microprocessor.

9. The method of claim 7 wherein the microprocessor optimizes the speeds of opening and closing of the modulating control valve based upon historical well pumping experience.

* * * * *

UNITED STATES PATENT AND TRADEMARK OFFICE
CERTIFICATE OF CORRECTION

PATENT NO. : 5,147,559
DATED : September 15, 1992
INVENTOR(S) : Robert W. Brophey, et al.

It is certified that error appears in the above-identified patent and that said Letters Patent is hereby corrected as shown below:

Column 4, Line 13, delete the word "o".

Column 4, Line 67, delete the word "include" and replace it with -- includes --.

Column 6, Line 52, after the word "electrical" insert -- signal to the microprocessor control allowing the computer --.

Column 7, Line 16, delete the word "tho" and replace it with -- the --.

Column 7, Line 52, delete the word "statue" and replace it with -- status --.

Column 8, Line 58, delete the word "P1" and replace it with -- 12 --.

Signed and Sealed this

Thirtieth Day of November, 1993

*Attest:*

BRUCE LEHMAN

*Attesting Officer*  *Commissioner of Patents and Trademarks*